United States Patent [19]

Stamer et al.

[11] Patent Number: 4,720,618

[45] Date of Patent: Jan. 19, 1988

[54] METHOD AND APPARATUS FOR EQUALIZING POWER OUTPUT IN A LASER MARKING SYSTEM

[75] Inventors: Michael E. Stamer, Lincolnwood; Stephen A. Kozich, Des Plaines, both of Ill.

[73] Assignee: Videojet Systems International, Inc., Elk Grove Village, Ill.

[21] Appl. No.: 894,366

[22] Filed: Aug. 7, 1986

[51] Int. Cl.⁴ .............................. B23K 26/00
[52] U.S. Cl. ................ 219/121 LA; 219/121 LH; 219/121 LJ; 346/76 L; 346/108
[58] Field of Search ............... 219/121 LA, 121 LB, 219/121 LH, 121 LJ; 346/76 L, 108; 372/31

[56] References Cited

U.S. PATENT DOCUMENTS

| 4,304,981 | 12/1981 | Gappa | 219/121 LJ X |
| 4,307,282 | 12/1981 | Gappa | 219/121 LJ |
| 4,347,523 | 8/1982 | Ohara | 346/108 |
| 4,546,995 | 6/1986 | Yamakawa et al. | 346/160 |
| 4,663,760 | 5/1987 | Shimada et al. | 372/31 |

*Primary Examiner*—C. L. Albritton
*Attorney, Agent, or Firm*—Jones, Day, Reavis & Pogue

[57] ABSTRACT

Variations in laser output power are compensated for by increasing the on time of weaker output lasers relative to the more powerful lasers. To avoid nonlinearities where the object to be marked is a moving substrate, the on time pulses which control the lasers are centered about a single time reference point. Additionally, for high printing rates a pre-ionization technique is disclosed which is utilized to enable a laser to fire more quickly than would otherwise be possible. Pre-ionization may be used for every dot to be printed or only when a laser has not been fired during the previous printing "stroke" depending upon the stroke rate.

14 Claims, 8 Drawing Figures

SYSTEM CONFIGURATION

6 STROKES/CHARACTER
(1 BLANK STROKE)

SUBSTRATE MOTION
IN EITHER DIRECTION

5X7 DOT MATRIX

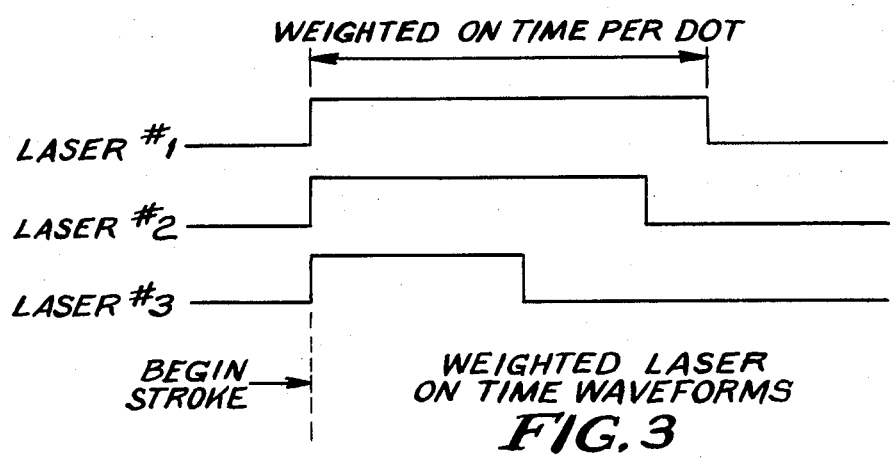
FIG. 3 WEIGHTED LASER ON TIME WAVEFORMS
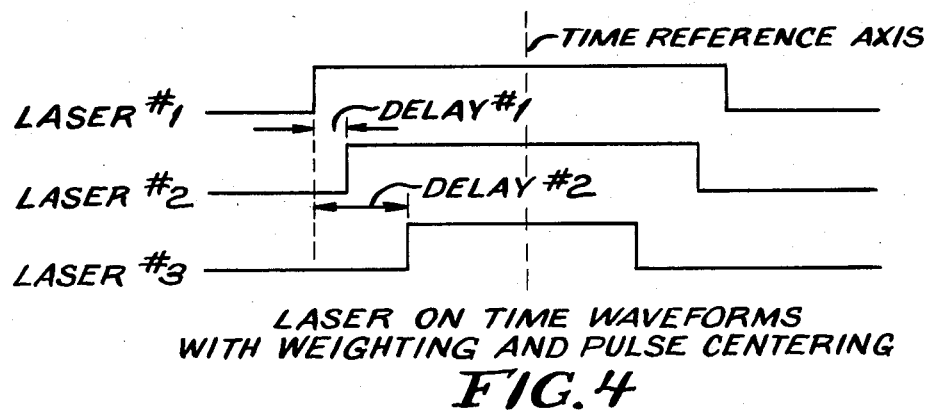
FIG. 4 LASER ON TIME WAVEFORMS WITH WEIGHTING AND PULSE CENTERING
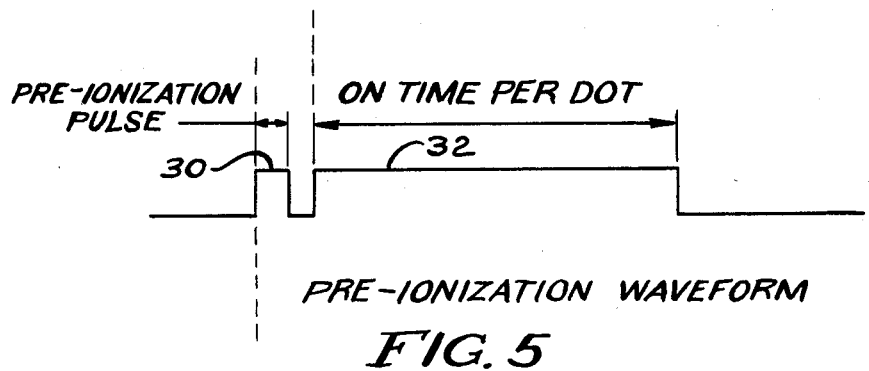
FIG. 5 PRE-IONIZATION WAVEFORM

METHOD AND APPARATUS FOR EQUALIZING POWER OUTPUT IN A LASER MARKING SYSTEM

BACKGROUND OF THE INVENTION

This invention relates to the field of marking devices for placing codes and the like on a substrate. More specifically, it relates to marking devices capable of placing alphanumeric codes, bar codes and other useful indicia on the surface of a product which moves relative to the marking device as, for example, on a conveyor. That device marks on objects moved past the laser beams. Alternatively, the present invention can be employed with a system which scans the beams across a stationary substrate, for example, using moving mirrors. Usually the marking is accomplished using a plurality of lasers having sufficient energy to permanently alter the surface of the product to be marked. One device with which the present invention may be employed is disclosed in U.S. patent application Ser. No. 596,898 assigned to the present assignee which application is hereby incorporated by reference.

Such a laser marking device employs a plurality of lasers, for example, seven. The output beam from each laser is sent through a beam delivery tube and a focusing lens onto the marking location. The seven beams are arranged by means of the lens to form a vertical column of seven beams, each capable of marking a dot onto the passing product. By moving the product transversely past the column, a dot matrix arrangement for printing alphanumeric characters is obtained in a manner well known in this art. By selectively turning on the lasers corresponding to the correct positions for a desired alphanumeric character, such symbols may be marked onto the product.

Typically, a 5×7 dot matrix is employed and thus, for each character to be printed, the seven lasers must be turned on and off five times in a sequence which will place dots where required to form the character. Each character is formed by turning on selected lasers simultaneously five separate times (each time being referred to as a stroke) as the substrate of the article to be marked moves past the laser lens. In printing characters in this manner variations in laser energy output cause degradation of the print quality. Some dots are only partially formed or are missing entirely. Others are too large. This variation in laser output energy can result from: (1) variation in nominal laser output power, (2) turn on delay, (3) turn on and turn off time constants, (4) energy density and beam shape variation. Indeed, efforts to match seven lasers so that their effective output power is essentially equal would be prohibitively expensive and perhaps impossible as power output can change over time.

The present invention discloses a method and apparatus for equalizing laser output by controlling the electrical drive signals for each laser. The result substantially reduces the effect of laser performance variation on print quality. The control takes several forms. First, the relative energy output of each laser is determined and its on time is adjusted by appropriately weighting the on time of each laser relative to the weakest laser beam. Alternatively, the beam weighting can be relative to other references, such as average beam energy or even an independent reference value. The use of variable width "on" time pulses for the lasers can, however, introduce nonlinearity in the formed characters. To avoid or minimize this problem, all of the "on" pulses are centered about a selected time axis. Thus, the combination of weighted "on" pulses coupled with pulse centering provides a significant improvement in overall print quality.

For high stroke rates an additional problem arises from the inability of the lasers to cycle fast enough. This problem is reduced by selectively preionizing the lasers to reduce turn on delay to permit significantly higher stroke rates while maintaining marking quality. Various pre-ionizing schemes may be employed depending upon the desired application.

It is accordingly an object of the present invention to provide an improved method and apparatus for equalizing the power output of the individual lasers employed in a laser marking system.

A further object of the invention is to provide a method and apparatus for varying the "on" pulse width of each laser in such a marking system to substantially equalize the energy outputs thereof.

Another object of the invention is to provide a method and apparatus for centering the "on" pulses used to trigger the lasers to insure vertical linearity of the energy dots produced therefrom for marking a moving substrate.

A further object of the invention is to provide a method and means whereby high stroke rates may be obtained by pre-ionizing the lasers to reduce turn on delay.

Other objects and advantages of the invention will be apparent from the remaining portion of the specification.

BRIEF DESCRIPTION OF THE DRAWINGS

FIGS. 3 through 6 are waveform diagrams useful in explaining the operation of the present invention.

DETAILED DESCRIPTION

Figure 1:
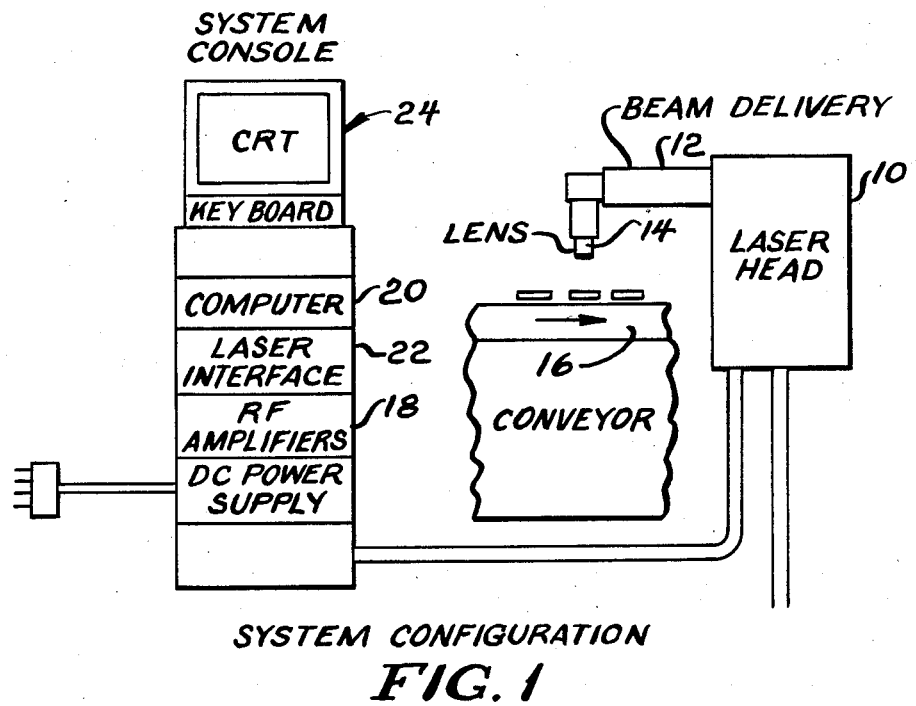
FIG. 1 is a schematic representation of a marking system incorporating the teachings of the present invention.

Referring to FIG. 1, the invention is suitable for use in a laser marking system. The system includes a laser head 10 containing a number of lasers, preferably $CO_2$ lasers, which are excited by RF energy at approximately 27 MHz to a nominal power of about 20 watts. The laser head typically will contain seven lasers, the outputs of which are directed through a beam delivery tube 12, via mirrors, onto a lens 14 which focuses the beams onto a marking area. In FIG. 1 the marking area is on the surface 16 of a conveyor system on which products to be marked are carried.

In the usual arrangement the outputs of the lasers are focused by the lens to form a vertical column of beams, in the case of seven lasers a seven high vertical column. Because the products to be marked move transversely with respect to the vertical column it is possible to create a 7×n dot matrix from which alphanumeric characters may be generated by selectively controlling the beam energy of each laser. For purposes of this application it will be assumed that a 7×5 dot matrix is desired and thus each matrix is composed of five vertical strokes from the seven lasers as the substrate to be marked moves past the marking point (see FIG. 2).

The RF exitation for the lasers is generated by amplifiers 18 located in a control console, one amplifier for each laser. In turn, the amplifiers are controlled by digital signals from a computer system 20 via a laser interface circuit 22 according to the present invention. Each laser is separately controllable by a signal which turns the laser on or off depending on the particular character to be printed. A keyboard and CRT unit 24 permit the operator to communicate with the computer to enter data and alter the operation of the laser interface 22 as will be described. As will be recognized by those skilled in the art, many computer systems can be employed as, for example, an Intel 80/24 single board computer system.

For a more detailed description of the laser marking apparatus per se, see U.S. patent application Ser. No. 596,898 assigned to the present assignee, which application is incorporated by reference.

Figure 2:
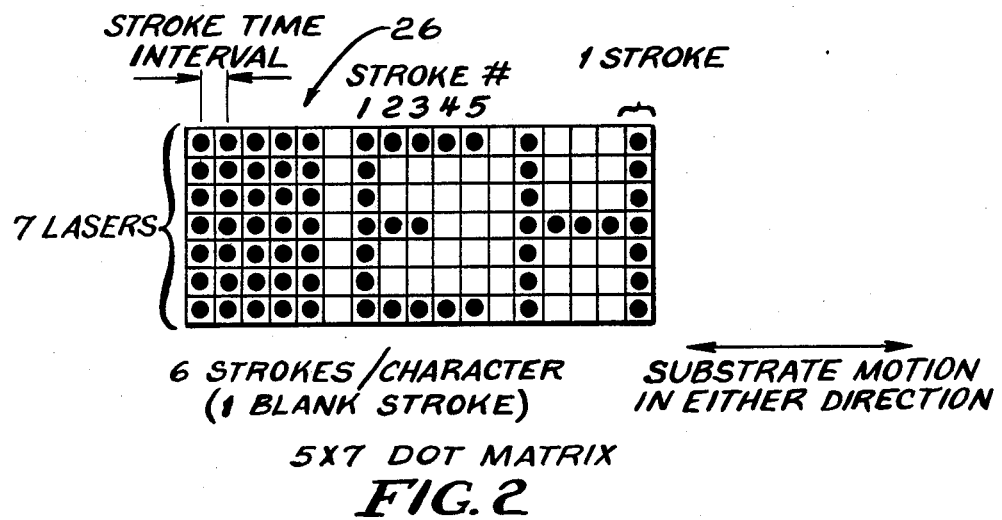
FIG. 2 is a representation of a dot matrix useful in explaining the marking arrangement of the present invention.

Referring to FIG. 2, there is shown a representation of the typical dot matrix which is created by the laser marking device of FIG. 1. Each matrix, which for exemplary purposes is 7×5, contains 35 dots. To generate useful information as, for example, to create the letters E and H, only selected dots are marked onto the substrate as it moves past the marking location. In a 7×5 dot matrix there are five "strokes", each stroke being one of the vertical columns. To create the letter E, for example, all lasers are turned on during the first stroke. During strokes 2 and 3 only lasers 1, 4 and 7 are turned on, while on strokes 4 and 5 only lasers 1 and 7 are on.

A significant problem with laser marking is the between laser variation in output power. Matching seven or more lasers so that they have virtually identical output power is not easily accomplished. Even were this possible on a commercial scale, changes in operating characteristics over time would soon produce the same problem. One way to overcome the variation in output power is to determine the minimum amount of on time the weakest laser requires to make an acceptable dot and to then turn on all of the lasers for that amount of time. However, such an approach results in the more powerful lasers having output energy which is more than required and causes the dots printed therefrom to be too large, resulting in unacceptable print quality.

Another approach is to equalize laser output by varying the amplitude of the RF signal used to fire the laser. Under this scheme a weaker laser could be excited with a higher amplitude signal producing a higher output. This method, however, involves the use of more costly RF amplifiers and the need for circuitry to adjust the amplifiers as a function of the beam output.

According to the present invention, a low cost but highly effective method and apparatus are disclosed for equalizing laser output power. The invention obtains the desired result by independently controlling the "on" time of each laser. This reduces the effect of turn on delays and variations in laser power between units. This method is advantageous because it may be easily implemented at low cost. Specifically, only two states, on and off, need be provided and a simple RF amplifier may be utilized.

Weighting and Pulse Centering

Referring to FIGS. 3 and 4, waveforms illustrating the operation of the invention are shown. FIG. 3 illustrates the turn on pulses for three of the seven lasers in a typical marking system. Laser No. 1 has been determined (arbitrarily) to be the laser with the lowest power output while laser No. 2 has an intermediate output and laser No. 3 the greatest output. At the beginning of a stroke (indicated by the vertical dashed line) all three lasers are turned on but remain on for different times, the on time corresponding inversely to their power output. Thus, laser No. 3 is on for the shortest period of time while laser No. 1 is on for the longest period of time. This will be referred to herein was weighting the on time pulse since it is typically obtained by calculating a weighting factor based on the laser having the lowest power output.

The weighting factors, which are provided to the computer, are used to turn on the more powerful lasers for a shorter time. This permits the energy output per laser to be equalized to a desired energy level. Thus, the operator selects a nominal on time pulse which is satisfactory for the weakest laser. He then determines the weighting factors for the remaining lasers (for example, a percentage of the weakest laser's on time). The computer then computes the actual on time for each other laser by multiplying the nominal on time by the weighting factor. This value is provided to the laser interface 22 as will be described.

Simply weighting the lasers on times to obtain equal power output would be satisfactory in a static or low speed marking system. Where, however, a dot matrix marking system is employed which relies upon relative movement between substrate and the laser beams, simply weighting the outputs does not produce completely satisfactory results. Variations in the on time for each laser produced by weighting may result in nonlinearity or skewing of the dots. This effect occurs because the weaker lasers stay on for a longer time so that the center of the dot is shifted relative to the dots created by the stronger lasers, due to movement of the substrate. The severity of nonlinearity depends on (1) the magnitude of the differences in weighting factors, (2) the speed of the substrate and (3) the stroke rate of the marking system. For high speed marking with severely mismatched lasers the weighting technique alone produces unacceptable marking quality.

A solution to the problem of nonlinearity is illustrated in FIG. 4. The weighting factors are retained and thus lasers 1, 2 and 3 are turned on for the same time period as in FIG. 3. In FIG. 4, however, the on time pulse for each laser is centered about a common time reference axis. Thus, instead of all lasers turning on at the same time, the weakest laser turns on first followed by the intermediate laser (laser No. 2) followed by the strongest laser (laser No. 3). There is a delay between the turn on of lasers 1 and 2 and between the turn on of lasers 2 and 3 and an equal but opposite set of delays for the turn off of these lasers. For purposes of this application this method of operation will be referred to as on pulse weighting and pulse centering. By centering the laser turn on pulses about a common time reference it is possible to insure that the center of each dot will be at the same spot on the substrate regardless of power output thereby eliminating nonlinearity. The appropriate delays may be empirically determined and provided to the computer system or they can be calculated by the computer from the weighting factors.

Laser Pre-Ionization

The use of weighting and pulse centering techniques provides a highly satisfactory result at relatively high energy levels (e.g., on time pulses greater than one millisecond). Additional techniques are necessary at low energy levels as may occur at high stroke rates (on time pulse widths less than 300 microseconds). This is because the on time pulse width at low energy levels is only two or three times longer than the turn on delays of the lasers. In fact, the slower lasers (those that have the greatest turn on delay) may have their output energy severely reduced at high stroke rates resulting in significantly less output power.

According to the present invention it is possible to decrease turn on delay so that its effects become relatively insignificant. This is accomplished by applying RF energy to the laser for a short time at the beginning of each stroke pulse followed by a variable delay (which may be zero) before the beginning of the actual on time pulse for generating the dot. This permits the laser to respond much faster when it is turned on to print a dot. The use of a short pre-ionization pulse significantly decreases turn on delay without causing significant laser output prior to the on pulse used for marking. Such pre-ionization pulses are required only for a stroke on which a particular laser is designated to print a dot.

The concept of pre-ionizing a laser is illustrated in FIG. 5. The vertical dashed line indicates the beginning of a stroke. A short pre-ionization pulse 30 is generated to prepare the laser to fire as soon as the on time pulse 32 is received. As indicated, the pulse 30 may be followed by a short delay 34 before the on time pulse is received or, in fact, the delay 34 may be zero in which case the pre-ionization pulse is immediately followed by the on time pulse. Either pre-ionization technique works satisfactorily under the present circumstances. Whether or not to use a delay between the pulses is a consideration determined primarily by the stroke rate at which the system is operating and whether or not a modification to the ionization technique is employed, such modification being described hereafter under the heading "No Dot/Every Dot Pre-ionization".

As will be described in connection with the pre-ionization timer in FIG. 7, the pre-ionization pulses 30 are of a duration controlled by a single timer. If desired, a separate timer can be provided for each laser. This would permit separate adjustment of each pre-ionization timer for the turn on delay associated with a particular laser. Although separate timers for each laser provide best matching, a single timer provides adequate performance and reduces circuit complexity.

No Dot/Every Dot Pre-ionization

In studying the effects of pre-ionization pulses on laser turn on, it has been determined that a pre-ionization pulse is effective only if it occurs relatively close (within a few milliseconds) to the leading edge of the laser turn on pulse. However, during high stroke rate printing (a millisecond or less between strokes, for example), if a particular laser prints dots for two or more consecutive strokes, each on pulse will itself provide pre-ionization for the next dot. Under these very special circumstances (high stroke rate, consecutive dots) the use of a separate pre-ionization pulse interferes with proper printing by starting the laser too early thus contributing to, rather than decreasing differences in laser energy output. In such a case laser energy is better equalized by not providing a separate pre-ionization pulse but instead relying on the pre-ionizing effect of the on pulse for the dot printed during the previous stroke.

Figure 6:
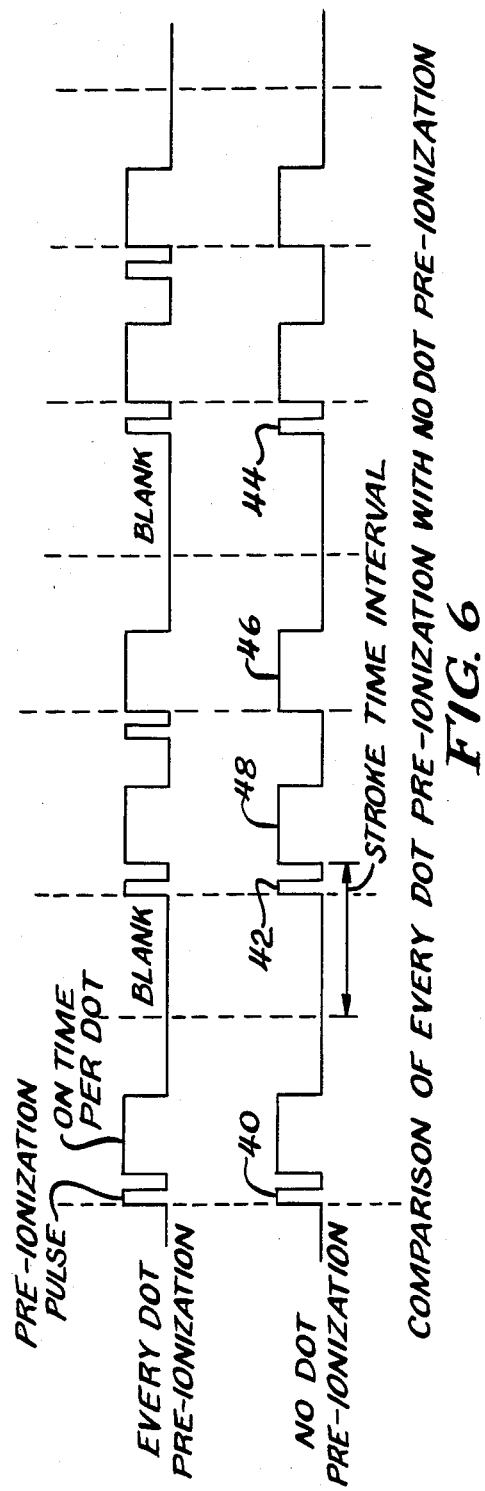
Figure 8:
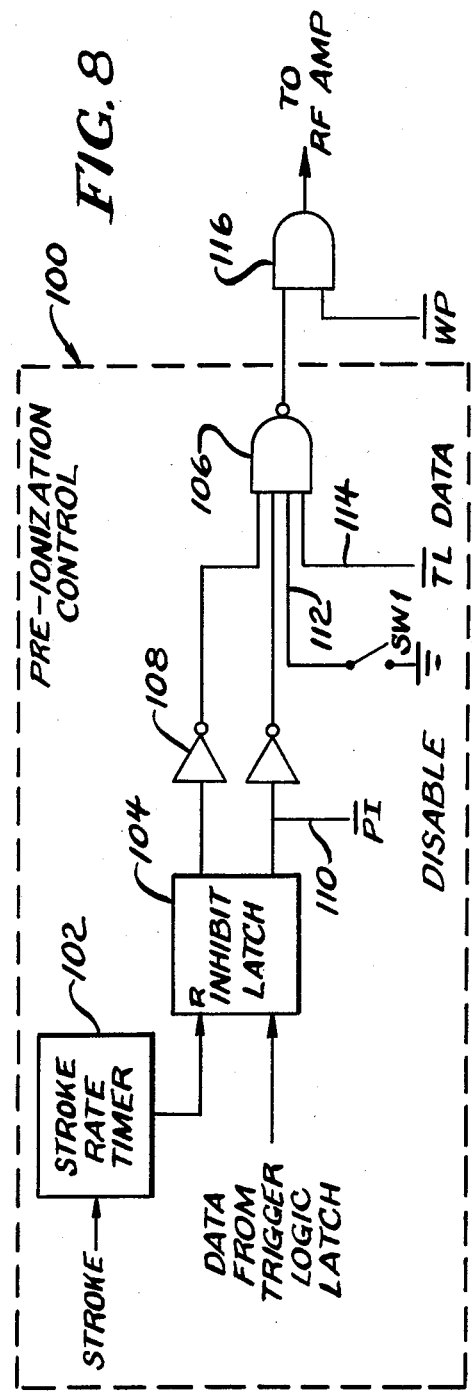
FIG. 8 is a schematic diagram illustrating the gating logic of FIG. 7.

In order to account for this phenomenon, it is necessary to detect stroke rate and whether or not a particular laser was fired during the previous stroke before permitting a pre-ionizing pulse to occur. As described in connection with FIG. 8, a no dot/every dot circuit is provided to detect stroke rates which are fast enough to require suppressing the pre-ionizing pulse and whether or not a particular laser was fired on the previous stroke. Thus, for example, at high stroke rates if no dot (a blank) was generated, it is still necessary to provide a pre-ionization pulse. The effect of the circuit of FIG. 8 is to insert pre-ionization pulses, at high stroke rates, only before dots which are preceded by blanks. The function of the circuit is shown in FIG. 6. The top waveform shows every dot pre-ionization as would occur at stroke rates below a threshold value. Thus, each time a stroke occurs, a pre-ionization pulse occurs before the on time pulse. Note, however, that in the case of a blank (no dot) there are no pre-ionization or on time pulses.

In the lower waveform there is a representation of the no dot pre-ionization mode wherein a pre-ionization pulse is generated if and only if the laser had not been turned on during the previous stroke. Thus, a preionization pulse is present at 40, 42 and 44 but not provided prior to turn on pulse 46 because the pre-ionization is accomplished by the prior on pulse 48 from the previous stroke. In effect, the logic determines whether the previous stroke was a dot or a blank and, if a dot, blocks the pre-ionization pulse to the RF amplifier.

PREFERRED EMBODIMENT

Figure 7:
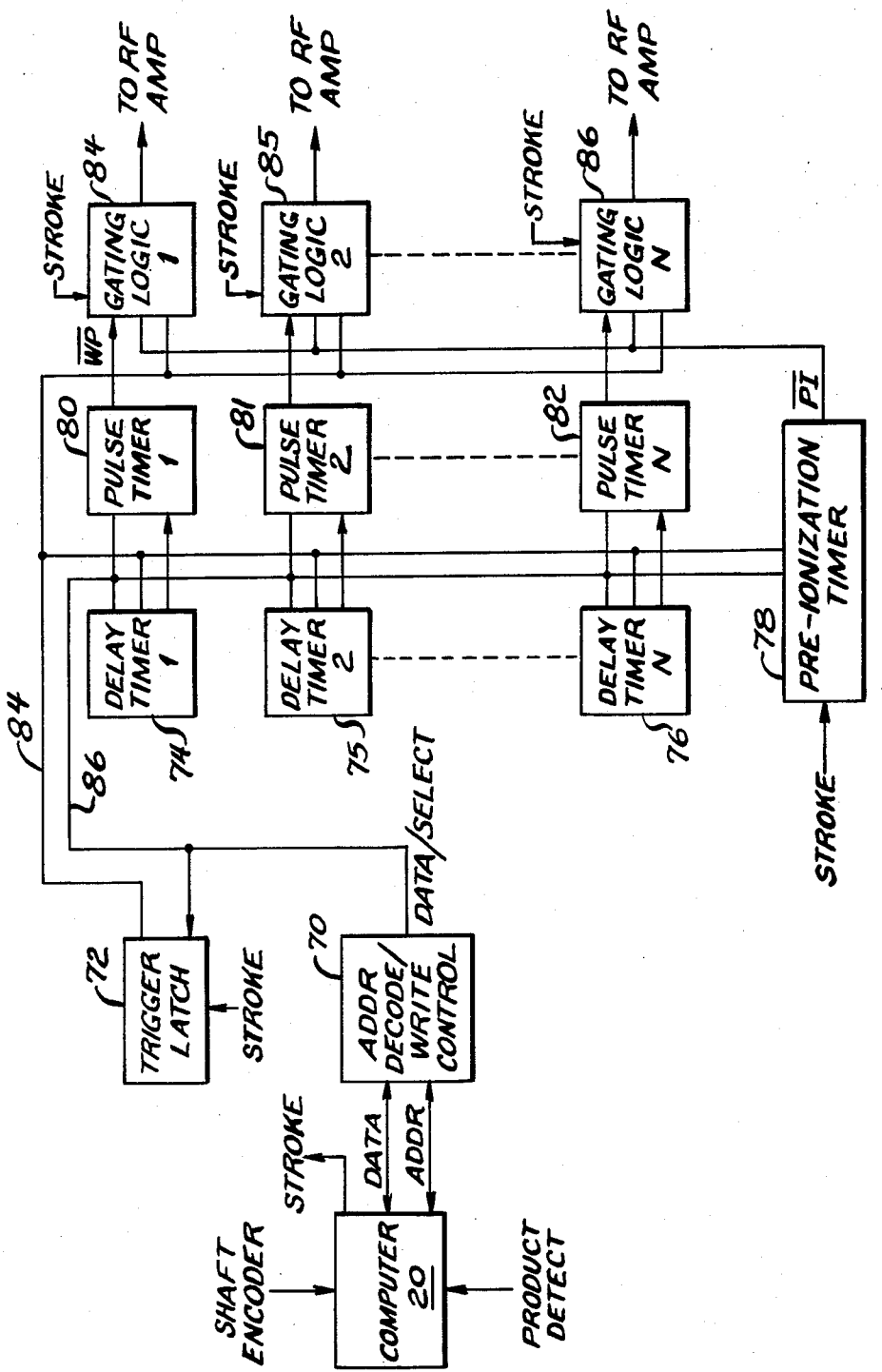
FIG. 7 is a block diagram illustrating a preferred embodiment of the invention.

Referring now to FIG. 7, a block diagram of the hardware implementation of the invention is illustrated. The computer 20, previously described, in addition to operator inputs via the keyboard, also receives signals from the conveyor system. These signals are indicated as the product detect and the shaft encoder signals. The first signal indicates that a product to be marked has reached the appropriate point for marking to commence. The shaft encoder signal indicates that it is time to initiate a stroke. This signal is derived from a rotating shaft associated with the conveyor system. Alternatively, a timer or oscillator may be employed to initiate stroke pulses a selected time after the product detect signal has been received. The computer 20 communicates with the various timing devices and logic associated with the invention through an address decode/write control device 70. The particular form of device is not critical but, for example, it may be a programmable array logic device included in an MMI PAL 14L8. The device 70 receives address data from the processor and responsive thereto directs associated data to selected devices connected to its output. In this case the devices are a trigger latch 72, delay timers 74–76, pre-ionization timer 78, and pulse timers 80–82. The data from the computer is simply buffered by device 70 and sent to the device selected by the address decoder.

The trigger latch 72 is loaded with the dot pattern data for each stroke and, when the stroke signal is received, activates the delay timers 74 through 76 and the pre-ionization timer 78 via bus 84. Delay timers 74 through 76, which provide the pulse centering function, communicate both with the trigger latch 72 and the address decode device 70. The appropriate delay value for a given laser is loaded in from the address decode 70 via the bus 86 while the trigger signal for the delay timers is received from the trigger latch 72 via bus 84. Only the delay timers for lasers which are to create a dot (rather than a blank) receive a signal from the trigger latch to initiate operation.

The output of each delay timer triggers the corresponding on pulse timer 80 through 82. These timers have also been previously loaded with a value to accomplish pulse weighting. The outputs of the pulse timers are provided to corresponding gating logic 88 through 90 which, as described subsequently in connection with FIG. 8, provides the pre-ionization features of the invention.

As indicated in FIG. 7, the number of timers and logic circuits provided is equal to the number of lasers utilized. Thus, there is a separate delay timer, pulse timer and gating logic circuit for each laser to be controlled. Conversely, there is but a single pre-ionization timer for all the lasers because of the small variation in turn on delay between laser devices although, if desired, a separate pre-ionization timer could be provided for each laser.

The timers are preferably re-triggerable, one shot timers and, for example, Intel 8253 devices are suitable for this purpose. Although the timers are shown as discrete devices and this, in fact, is the preferred embodiment, it is possible to implement the timing function through a computer software routine where speed is not critical. In such case it would not be necessary to provide discrete timer devices to perform the functions specified.

Gating Logic

Referring now to FIG. 8, an example of the gating logic circuits 88-90 is shown in detail. The logic circuit consists of a pre-ionization control section 100 ORed with the output signal, $\overline{WP}$ from the pulse timers 80 through 82. The pre-ionization control 100 includes a stroke rate timer 102., an inhibit latch 104 and a NAND gate 106. The stroke rate timer 102 receives the stroke signals from the computer 20 and determines the rate at which the strokes are generated. If the timer times out before another stroke is received, it indicates a sufficiently slow stroke rate that pre-ionization on every stroke is preferred. More specifically, the stroke rate is low enough so that there is no concern that a previous on pulse has pre-ionized the laser making it undesirable to permit additional pre-ionization. Conversely, if the stroke rate timer does not time out, it indicates that the system is operating at a stroke rate fast enough so that it is necessary to selectively inhibit pre-ionization pulses.

Inhibit latch 104 is reset by the stroke rate timer 102 if the latter times out thereby permitting a pre-ionization pulse to occur (unless inhibited by the other inputs to gate 106). In the absence of a reset signal, the operation of the inhibit latch is as follows.

The pre-ionization timer 78 generates a signal at the beginning of each stroke. This signal, if not blocked by latch 104, generates a pre-ionization pulse of a duration determined by the pre-ionization timer setting. The data for a particular laser stroke (either a logic zero or a logic one from the trigger latch) is loaded into the inhibit latch by the trailing edge of the pre-ionization timer signal, $\overline{PI}$. If the data is a logic one and the stroke rate is fast enough to avoid a reset from timer 102, the inhibit condition exists because the laser has been pre-ionized by the preceding stroke on pulse. The output of the latch 104 is a logical one but is inverted at 108 thereby blocking the ionization signal at gate 106. Conversely, if the data is a logic zero, a low output results from the latch which, in turn, enables gate 106 (assuming no other gate input is low).

Thus the inhibit latch functions to monitor the data from the preceding stroke and inhibits the ionization pulse when necessary (assuming the stroke rate is fast enough).

The other inputs to gate 106 are the pre-ionization pulse itself from the timer 78 via line 110, a manual disable switch via line 112, and a data signal from the trigger latch 72 via line 114. The signal on line 110, if the gate 106 is enabled, creates a pre-ionization pulse via gate 116 (an OR gate for negative logic signals).

The input to gate 106 on line 114 is the data for the current stroke. Obviously if the laser is not to be turned on for that stroke (a blank is selected) there is no need for a pre-ionization pulse. It is, therefore, blocked by gate 106 when a logic zero is present on line 114.

Operation

Operation of the circuit of FIGS. 7 and 8 is as follows. The system operator enters time values into the computer. In turn, these values are loaded into the timers. Specifically, the operator enters values for the pre-ionization timer 78, the stroke delay timers 74 through 76, the pulse timers 80 through 82 and the stroke rate timer 102.

The sequence of printing an alphanumeric character begins when a product is detected. The computer then waits until a stroke is required (either generated internally by a programmable timer or externally generated from the shaft encoder signal). For every stroke the computer sends a seven bit pattern (for a seven laser system) to the trigger latch 72 via the address encode circuit 70. A logic one is sent if a dot is desired and a logic zero is sent if a blank or no dot is desired. When the stroke signal is received by the trigger latch, it triggers the appropriate delay timers which begin counting to properly center the on pulses about a selected time reference.

The outputs of the delay timers are connected to trigger the corresponding pulse timer when each delay timer times out. The pulse timers, if triggered, generate the weighted on pulses corresponding to the relative power output of the particular laser with which it is associated.

The outputs from the on pulse timers are gated with the pre-ionization pulse from the pre-ionization timer as shown in FIG. 8. After triggering, the trigger latch 72 is cleared in preparation for the next stroke. When the next stroke signal is received the entire sequence repeats.

The pre-ionization timer is triggered simultaneously with the trigger latch by the stroke signal. The pre-ionization timer output, common to all lasers, is processed by the control logic of FIG. 8. The pre-ionization pulse is allowed to pass through to the corresponding RF amplifier only under the following conditions:

(1) The pre-ionization function has not been manually disabled by switch SW1 on line 112.

(2) The data bit in the stroke pattern calls for a dot (rather than a blank).

(3) The stroke period is greater than the threshold value contained in the stroke rate timer 102, or if the stroke period is less than the stroke rate timer value the previous stroke data bit called for a blank.

From the foregoing it will be apparent that an improved laser marking device has been disclosed by virtue of a method and apparatus capable of equalizing the output performance of a plurality of lasers used to generate a dot matrix on a moving substrate.

While we have shown and described embodiments of the invention, it will be understood that this description and illustrations are offered merely by way of example, and that the invention is to be limited in scope only as to the appended claims.

We claim:

1. A method for equalizing the energy outputs of a plurality of lasers, the outputs being caused to scan a substrate to mark symbols thereon comprising the steps of:
    (a) adjusting the on time period of each laser as a function of its energy output relative to a reference value thereby to equalize said energy outputs;
    (b) centering the on time periods of said lasers about a common time reference point to maintain marking quality.

2. A method for equalizing the energy outputs from a plurality of lasers, said outputs arranged in a linear column and caused to scan a substrate for repetitively marking (stroking) dots onto said substrate comprising the steps of:
    (a) adjusting the on time period of each laser as a function of its energy output relative to a reference value thereby to equalize said energy outputs;
    (b) centering the on time periods of said lasers about a common time reference point to maintain marking quality, the centering serving to reduce nonlinearity of the marked symbols associated with the relative movement between the outputs and the substrate.

3. The method of claim 1 further including the step of:
    pre-ionizing the lasers to be energized, prior to said on time period, to reduce turn on delay and permit faster marking.

4. The method of claim 2 further including the step of:
    pre-ionizing the lasers to be energized on a given marking stroke, prior to said on time period, to reduce turn on delay and permit faster marking.

5. The method of claim 3 where the step of pre-ionizing is accomplished by pulsing the lasers to be energized for a short duration just prior to said on time period.

6. The method of claim 4 wherein the step of pre-ionizing is accomplished by:
    (a) determining the stroke rate at which the marking is occurring;
    (b) pulsing, for a short duration just prior to said on time period, all of the lasers to be energized if said stroke rate is less than a selected value;
    (c) pulsing, for a short duration just prior to said on time period, only those lasers to be energized which were not energized on the immediately preceding marking stroke if said stroke rate is at least equal to said selected value;
    whereby pre-ionization pulses are inhibited at high stroke rates where the desired pre-ionizing effect is obtained from the on time period of the immediately previous marking stroke.

7. Apparatus for equalizing the energy outputs of a plurality of lasers, the outputs being caused to scan a substrate to mark symbols thereon comprising:
    (a) means for adjusting the on time period of each laser as a function of its energy output relative to a reference value thereby to equalize said energy outputs;
    (b) means for centering the on time periods of said lasers about a common time reference point to maintain marking quality.

8. Apparatus for equalizing the energy outputs from a plurality of lasers, said outputs arranged in a linear column and caused to scan a substrate for repetitively marking (stroking) dots onto said substrate to form symbols comprising:
    (a) means for adjusting the on time period of each laser as a function of its energy output relative to a reference value thereby to equalize said energy outputs;
    (b) means for centering the on time periods of said lasers about a common time reference point to maintain marking quality, the centering serving to reduce nonlinearity of the marked symbols associated with the relative movement between the laser outputs and said substrate.

9. The apparatus of claim 8 further including means for pre-ionizing the lasers to be energized on a given marking stroke, prior to said on time period, to reduce turn on delay and permit faster marking.

10. The apparatus of claim 9 wherein the means for pre-ionizing includes:
    (a) means for determining the stroke rate at which the marking is occurring;
    (b) means for producing short duration preionizing pulses just prior to said on time period for:
        (i) all of the lasers to be energized if said stroke rate is less than a selected value;
        (ii) only those lasers to be energized which were not energized on the immediately preceding marking stroke if said stroke rate is at least equal to said selected value;
    whereby pre-ionization pulses are inhibited at high stroke rates where the desired pre-ionizing effect is obtained from the on time period of the immediately previous marking stroke.

11. The apparatus of claim 8 wherein said adjusting means are a plurality of presettable pulse timers, one for each laser, said pulse timers, when triggered, determining the on time period of the lasers.

12. The apparatus of claim 11 wherein said centering means are a plurality of presettable delay timers, one for each laser, said delay timers triggering said pulse timers in the correct sequence to center the on time period of the lasers about said common time reference point.

13. The apparatus of claim 10 wherein said determining means is a stroke rate timer producing a first output signal if the stroke rate is below a selected threshold value and a second output signal otherwise, said means for producing pre-ionizing pulses being responsive thereto.

14. The apparatus of claim 10 wherein said means for producing pre-ionizing pulses includes:
    (a) a pre-ionization timer, the output of which determines the duration of said pre-ionization pulses;
    (b) means for gating said pre-ionization timer output as a function of at least said stroke rate determining means.

* * * * *